United States Patent [19]

Shal-Bar

[11] Patent Number: 4,979,770
[45] Date of Patent: Dec. 25, 1990

[54] BUMPER HAVING PIVOTAL BUMPER BAR FOR HEAVY MECHANIZED VEHICLES

[76] Inventor: Dan J. Shal-Bar, 40500 Even Yehuda, Israel

[21] Appl. No.: 230,077

[22] Filed: Aug. 9, 1988

[51] Int. Cl.[5] .............................................. B60R 19/28
[52] U.S. Cl. .................................... 293/131; 293/137
[58] Field of Search ............... 293/117, 118, 119, 102, 293/135, 136, 137, 131, 132, 114

[56] References Cited

U.S. PATENT DOCUMENTS

| | | | |
|---|---|---|---|
| 521,307 | 6/1894 | Crawford | 293/137 |
| 548,173 | 10/1895 | Black | 293/137 X |
| 1,382,302 | 6/1921 | McCallin | 239/102 |
| 2,890,076 | 7/1959 | Brechler | 293/137 X |
| 3,349,865 | 10/1967 | Deutsch | 293/117 X |
| 3,533,654 | 10/1970 | Kannegieter | 293/118 |
| 3,741,560 | 6/1973 | Schaller | 239/136 X |
| 3,774,714 | 11/1973 | Usui et al. | 293/117 X |
| 3,992,047 | 11/1976 | Barényi et al. | 293/117 X |
| 4,247,138 | 1/1981 | Child | 293/131 X |
| 4,624,493 | 11/1986 | Hillebrand et al. | 293/137 X |

FOREIGN PATENT DOCUMENTS

| | | | |
|---|---|---|---|
| 2458278 | 6/1976 | Fed. Rep. of Germany | 293/102 |
| 0083635 | 6/1980 | Japan | 293/102 |
| 1402031 | 8/1975 | United Kingdom | 293/137 |

OTHER PUBLICATIONS

Pamphlet "Clever Bumper", Dan-Or Research and Development Ltd., Even Yehuda, Israel.

*Primary Examiner*—Andres Kashnikow
*Attorney, Agent, or Firm*—Fleit, Jacobson, Cohn, Price, Holman & Stern

[57] ABSTRACT

The present invention relates to a bumper construction for mechanized vehicles, especially heavy ones. The bumper is movable relative to the body and chassis of the vehicle, in an upward direction relative to the surface on which the vehicle is travelling.

The bumper bar is pivotally affixed to at least two angle members having one arm extending horizontally and second arm extending upwardly and downwardly. The first arm is enclosed in a casing in which is provided an energy consuming device and which is fixedly attached to the chassis.

6 Claims, 2 Drawing Sheets

BUMPER HAVING PIVOTAL BUMPER BAR FOR HEAVY MECHANIZED VEHICLES

BACKGROUND OF THE INVENTION

The present invention relates to improvements in bumpers for vehicles, and more particularly to rear bumpers for lorries.

It is known to construct mechanized vehicles, especially lorries and vans, with bumpers, particularly rear bumpers which are displaceable relative to the body and/or chassis of the vehicle. This is mostly done in order to afford more convenient access to the rear of the vehicle for loading onto or into it large volume containers or packages—or unloading such containers or packages from the vehicle.

So for instance describes U.S. Pat. No. 3,533,654 a "shiftable bumper". This patent describes a bumper which is pivotally mounted on the frame of the vehicle. The bumper can assume a "normal", upper position and can be swung downwardly, so that the access to the tail gate of the vehicle is unobstructed and can be swung down freely.

German Patent No. 24 38 828 describes an arrangement including a bumper for heavy vehicles which is connnected to the chassis with the interposition of an energy consuming member. Here, while the bumper, strictly speaking, may be considered as movable, the purpose of the arrangement is mainly absorption of mechanical shocks.

OBJECT OF THE INVENTION

It is the object of the present invention to provide a bumper which will move relative to the body and chassis of the vehicle.

It is another object of the invention to provide a bumper which will adapt itself to the ground conditions.

It is yet another object of the invention to provide a bumper which will cushion any impact thereon.

SHORT SUMMARY OF THE INVENTION

In contradistinction to the known arrangements the present invention relates to a bumper construction at which the bumper is movable relative to the body and chassis of the vehicle. However, this movement is in an upward direction relative to the surface on which the vehicle is standing or travelling, the bumper bar proper being pivotally affixed to at least two angle members having one arm extending horizontally and a second arm extending up and downwardly from said first arm. The first arm is enclosed in a casing in which is provided an energy consuming device against which the first arm abuts. The casing is fixedly attached to the chassis of the vehicle.

In a preferred embodiment a compressible and cushioning member is inserted in said casing, between the upper side of said horizontal arm of the angle member and the inside of the top of the casing. A further such compressible member advantageously is placed between the vertical arm of the angle member and the bumper bar proper.

BRIEF DESCRIPTION OF THE DRAWINGS

These and further features of the invention will become clear from the following detailed description which has reference to the annexed drawings.

In the drawings, FIG. 1 is a sectional, elevational view of the preferred embodiment of the new bumper arrangement, while

DESCRIPTION OF PREFERRED EMBODIMENT

Figure 1:
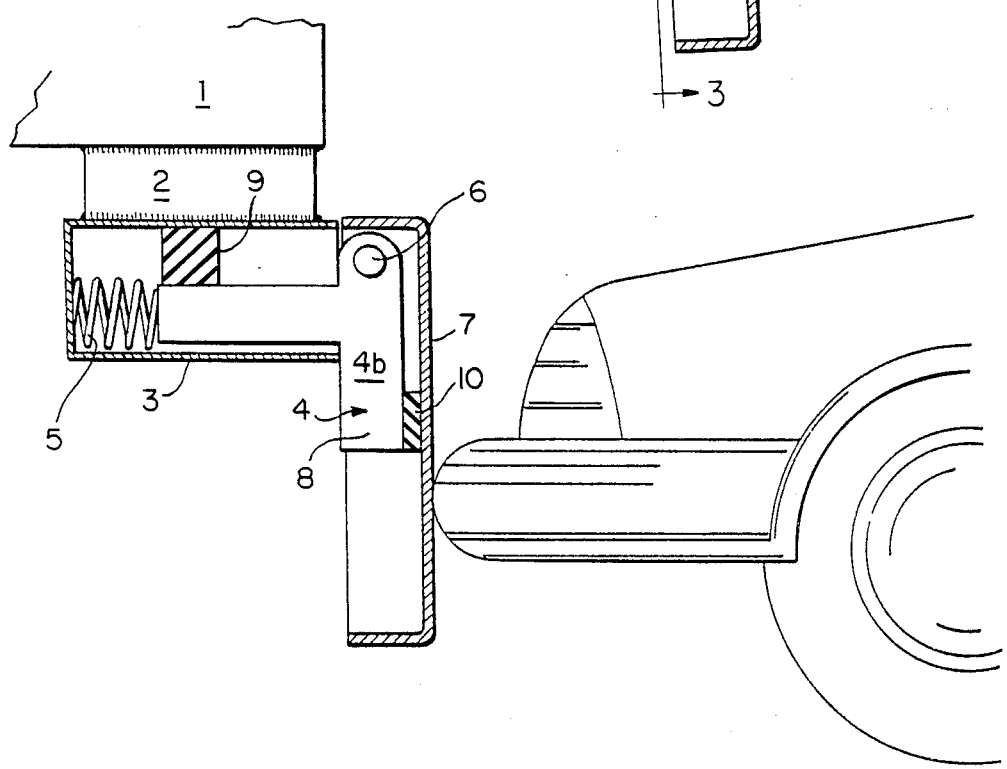
Figure 3:
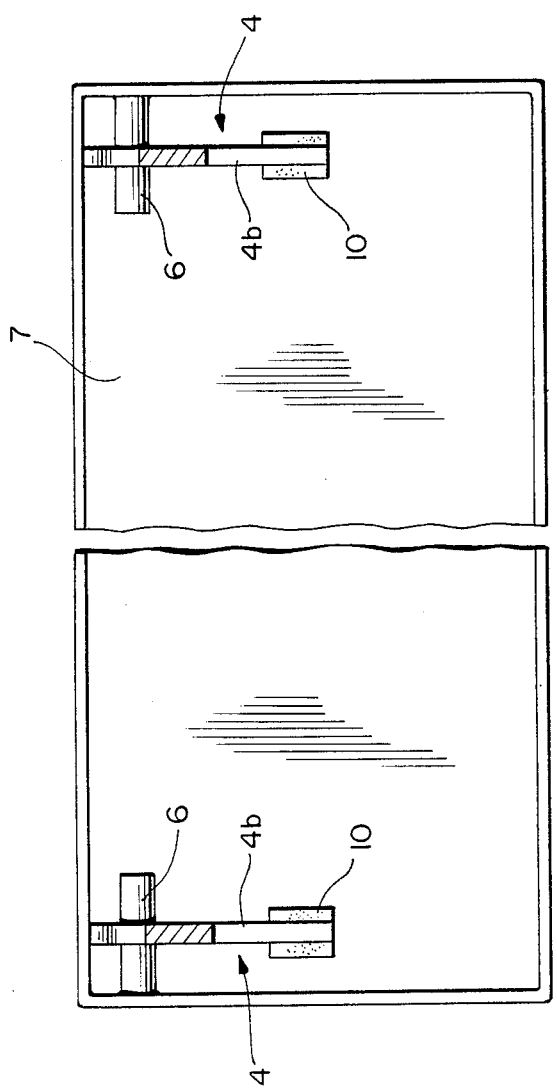
FIG. 3 is a view, partly in section along line 3—3 of FIG. 2

Turning first to FIG. 1 - to a chassis part 1 is affixed by welding a distance piece 2 (in fact two such pieces are provided - one at each side of the vehicle). To distance piece 2 is welded a casing 3 into which extends a first, horizontal arm 4a of an angle member 4. At the rear end of arm 4a, within casing 3 is positioned a strong helical spring 5. From arm 4a extends downwardly, a second, vertical arm 4b of the angle 4. To the upper, free end of arm 4b (or rather to both arms 4b of the two angles) is pivotally connected the bumper bar 7 proper, by means of pins 6.

On top of arm 4a and between it and the top wall of casing 3 is inserted a compressible cushioning member 9, which may consist of rubber or compressible plastics, but may be also constituted by one or more helical or other springs. A further such compressible member 10 may be placed between arm 4b and the bumper bar 7.

Figure 2:
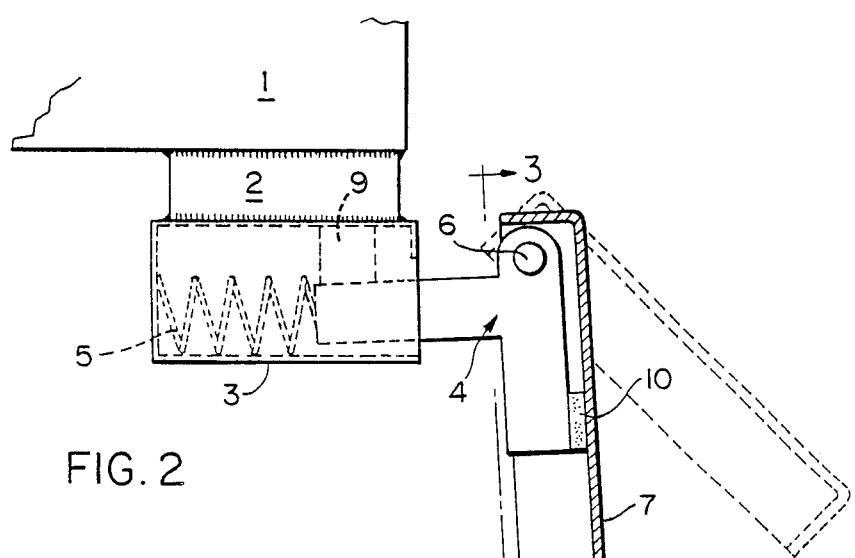
FIG. 2 is an elevational view of the arrangement illustrating the outswung position of the bumper bar.

The new bumper arrangement, as has been mentioned, is particularly adapted for use on heavy vehicles. It frequently happens that in a travelling in downward direction on steeply inclined roads, the bumper bar of a heavy vehicle, especially if the vehicle is carrying a heavy load, contacts the ground and interferes with smooth going of the vehicle. To prevent such interference, the angle piece, which preferably slides with arm 4a into and out of casing 3, is pulled outwardly, as shown in FIG. 2 and the bumper bar 7 is swung about pins 6 to the position shown by broken lines in FIG. 2. In this position there is no likelihood that the edge of the bumper bar would contact the ground, even on very steeply inclined terrain.

Normally the bumper is held in a "down" position and functions in the same way as every conventional bumper. As FIg. 1 clearly shows in such a "down" position, bumper bar 7 is adjacent and substantially parallel to second arm 4b Upon rearward collision with another vehicle—the spring 5 is caused to contact, thus absorbing the energy of the hit.

Whenever such collision is experienced the member 4 is forced into casing 3 against the bias of spring 5. In case that such movement would cause the arm 4a to deviate from the strictly horizontal position, it will not jam, but will compress the body 9, as shown also in Fig. 2.

Certain variations of the invention idea are possible without departing from the gist of the invention. In lieu of a spring 5 another energy absorbing means may be placed in casing 3. Electrical contacts 8 may be provided on arm 4b which are under current from the vehicle battery and operate signalling means in the driver's cabin.

I claim:
1. A bumper construction for a mechanized vehicle,, said bumper construction, in combination, comprising:
   a chasssi of a vehicle,
   two angle members, each angle member having a first arm and a second arm connected to each other,
   a casing mounted on a rear end of said chassis and connecting said two angle members to said rear end of said chassis, said first arm being slidably mounted in said casing,
an energy consuming device located in said casing between a free end of said first arm and an end wall of said casing,
a bumper bar having an upper end pivotally affixed to said two angle members so as to pivot between a normal vertically extending position located adjacent and substantially parallel to each said second arm, and an outswung angled position relative to each said second arm extending downwardly from said first arm so that upon striking of said bumper bar from the rear, said bumper bar is moved forwardly and said energy consuming device is compressed and upon contact of a free end of said bumper bar as said chassis is moved forwardly, the free end of said bumper bar moves upwardly and rearwardly, away from said chassis.

2. The bumper construction claimed in claim wherein said energy consuming device is a helical spring.

3. The bumper construction claimed in claim 1, and further comprising:
a distance piece to which said casing is affixed, said distance piece being fixedly attached to the vehicle chassis.

4. The bumper construction claimed in claim 1, and further comprising:
a compressible and cushioning member inserted in the casing between an upper side of each said first arm of the angle members and the inside of the top of the casing.

5. The bumper construction claimed in claim 4, and further comprising:
a second compressible member between each said second arm of the angle members and the bumper bar.

6. The bumper construction claimed in claim 1, and futher comprising
an electrical contact for signalling when said bumper bar has pivoted from said normal position.

* * * * *